United States Patent [19]
Ohba

[11] Patent Number: 5,205,782
[45] Date of Patent: Apr. 27, 1993

[54] CAR VENTILATING SYSTEM

[76] Inventor: Shunji Ohba, 2667-5, Funaki, Shimada-shi, Shizuoka, Japan

[21] Appl. No.: 936,880

[22] Filed: Aug. 27, 1992

Related U.S. Application Data

[63] Continuation of Ser. No. 669,838, Mar. 15, 1991, abandoned.

[30] Foreign Application Priority Data

Mar. 22, 1990 [JP] Japan .............................. 2-29517[U]
Jun. 20, 1990 [JP] Japan .............................. 2-65189[U]

[51] Int. Cl.$^5$ ............................................. B60H 1/26
[52] U.S. Cl. .................................... 454/141; 454/900
[58] Field of Search ............... 454/75, 137, 141, 144, 454/156, 162, 900

[56] References Cited

U.S. PATENT DOCUMENTS

| 1,550,503 | 8/1925 | Coffman | 98/2.14 |
| 1,846,552 | 2/1932 | Haskins | 98/2.15 |
| 4,741,256 | 5/1988 | Huang | 98/2.14 |
| 4,804,140 | 2/1989 | Cantrell | 98/2.02 X |

FOREIGN PATENT DOCUMENTS

| 3016907 | 11/1981 | Fed. Rep. of Germany | 98/2.02 |
| 57022 | 4/1984 | Japan | 98/2.02 |
| 63418 | 3/1989 | Japan | 98/2.02 |

Primary Examiner—Harold Joyce
Attorney, Agent, or Firm—Jordan and Hamburg

[57] ABSTRACT

An exhaust path penetrating through a portion of a vehicle's body to exhaust air in a cabin of a vehicle with an air-flow activating means and a valve which opens only when the fresh-air activating means works, a fresh-air conducting path penetrating through a portion of said vehicle's body to conduct fresh-air into the cabin with an air-flow activating means and a valve which opens only when the air-flow activating means works, and an electric circuit which drives each of said air-flow activating means and each of said valves with electricity supplied from solar cells mounted on an external face of said vehicle's body to receive sunlight and generate electricity.

4 Claims, 5 Drawing Sheets

CAR VENTILATING SYSTEM

This application is a continuation of application Ser. No. 07/669,838, filed Mar. 15, 1991, abandoned.

BACKGROUND OF THE INVENTION

This invention related to an automatic ventilating device for a cabin of a vehicle such as a passenger car or a truck, more particularly, to a ventilating device which prevents temperature in a cabin of a vehicle from going too high during the vehicle's parking time.

Sometimes temperature in a cabin of a vehicle raises, during its parking time with the engine stopped, to an extremely high degree which we can never experience in our daily life. For instance, if a vehicle is left under the burning sun in the summer, temperature in a cabin of the vehicle goes up to 60 to 70 degrees centigrade.

When an engine is running, it is possible to prevent temperature in a cabin of a vehicle from going up too high with an air conditioner, but the fuel consumption rate of an air conditioner is generally very high, and leaving a vehicle with the engine running when nobody is in it may cause problems concerning safety. Also parking with windows open is risky because of the possibility of theft and is not practical.

Recently, some people use a fan which is mounted on a portion of a car window and can be run during parking time to ventilate air in a cabin of the car to prevent temperature in the cabin from going up too high. Since this device can easily be broken into, however, it is inadequate for the prevention of theft, and also since battery consumption due to rotation of the fan is large, the device has not spread so much.

A principle object of the present invention is to provide a cabin ventilating device which is driven by solar energy and ventilates air in a cabin of a vehicle while parking without consuming fuel and battery.

Another object of the present invention is to provide a cabin ventilating device which is hard to break into and is free from the possibility of theft.

SUMMARY OF THE INVENTION

Preferably a ventilating device according to the present invention has an exhaust path penetrating through a portion of a vehicle's body to exhaust air in the cabin of a vehicle to outside, a fresh-air conducting path penetrating through a portion of the vehicle's body to conduct fresh air into the cabin of the vehicle, a valve arranged in said exhaust path, an air-flow activating means arranged in series with this valve, a valve arranged in said fresh-air conducting path, an air-flow activating means arranged in series to with this valve, solar cells which are arranged on an external surface of the vehicle to receive sunlight and generate electricity, and an electric circuit which drives each of said air-flow activating means by making use of electricity from said solar cells.

Since the air-flow activating means arranged in the exhaust path and in the fresh-air conducting path are driven by the energy generated by the solar cells and do not consume fuel or battery energy, this ventilating device is quite energy saving. On fine days when temperature in a cabin of a vehicle goes high, the solar cells can generate and supply as much electricity as required by the air-flow activating means. On rainy days or at night when ventilation is not necessary, electric energy generated by the solar cells is little, and the ventilating device does not work.

The exhaust path and the fresh-air conducting path penetrate through a portion of the vehicle's body, and there are valves arranged near and to the exterior side from the air-flow activating means, so that the driver does not have to worry about destruction or theft during parking time. The valves are kept closed when the air-flow activating means does not work, and this feature prevents cool air from coming into the cabin when running, especially in the winter, and a warming effect in the cabin does not go down.

Preferably, the inlet of the exhaust path should be arranged on a ceiling of the cabin, while the inlet of the fresh-air conducting path should be arranged on an external face of the vehicle's body. With this arrangement, air with high temperature, which gathers near the ceiling of the cabin, is easily ventilated by fresh air with low temperature conducted to the cabin from the shade under the vehicle's body, which insures efficiency in lowering temperature in the cabin.

Preferably, a bulkhead is arranged in the aforesaid exhaust path and the aforesaid fresh-air conducting path respectively to the exterior side from the aforesaid valves. This bulkhead can prevent rain water and the like from coming into the cabin from the exhaust path and the fresh-air conducting path when driving on a rainy day.

Also preferably, in an electric circuit coupling said solar cells to each of said air-flow activating means, a power switch, a switch correlating to and engine key switch, and a thermostat which works according to temperature in the cabin are arranged in series. With this arrangement, the air-flow activating means automatically works only when the engine does not run and temperature in the cabin is high, and the solar cells may be of compact size with small capacity.

DESCRIPTION OF PREFERRED EMBODIMENT

Figure 1:
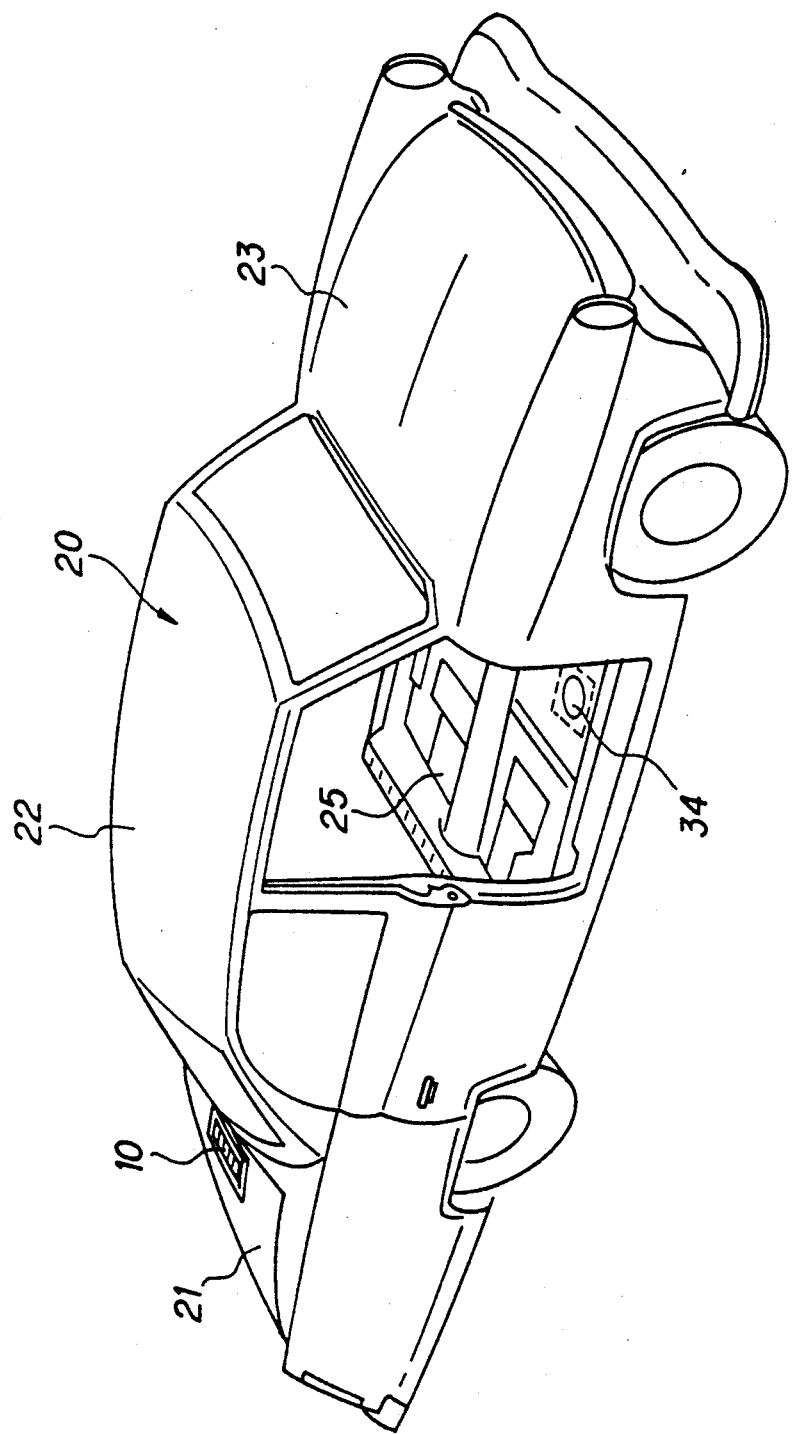
FIG. 1 is a perspective view showing a portion of a car to which the present invention is applied.

In FIG. 1, a solar cell 10 having a light collecting board which receives sunlight is mounted on a top face of a rear section (trunk) of a vehicle's body 20. Note that the solar cell 10 may be mounted on the ceiling 22 of the vehicle's body 20 or on a surface of a bonnet 23, or on other section exposed to sunlight.

Although not shown in FIG. 1, a convertor which converts a direct current generated by the solar cell 10 to an alternating current and a battery which stores electric energy generated by the solar cell 10 are incorporated.

Figure 2:
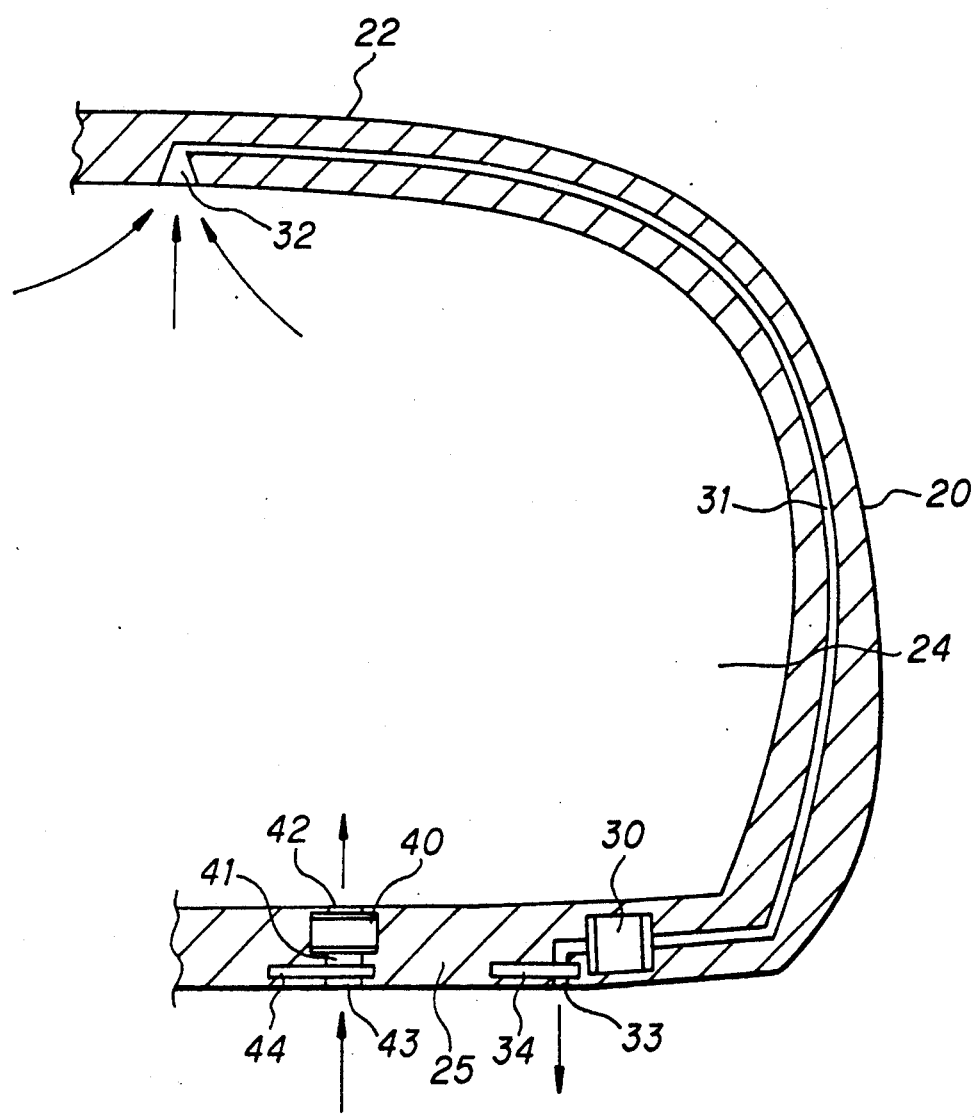
FIG. 2 is a sectional view of a vehicle's body along a center line of the exhaust path.

As shown also in FIG. 2, an exhaust path 31 which exhausts air in a cabin 24 through a piping running through the vehicle's body 20 to outside and a fresh-air conducting path 41 which conducts fresh air from outside into the cabin 24 are arranged. The exhaust path 31 takes out air from an inlet port 32 on the ceiling 22 of the cabin 24 and exhausts the air from an outlet port 33 on an external face of a floor panel 23. The fresh-air conducting path 41 sends fresh air took from an inlet port 43 on an external face of the floor panel 25 into the cabin 24 from an outlet port 42 on an internal face of the floor panel 25.

An air-flow activating unit 30 which works using said solar cell 10 as a power source is arranged on said exhaust path 31. This air-flow activating unit 30 comprises, for instance, an electrically operated fan, and discharges air in the cabin the outside.

A valve 34, which opens and closes the exhaust path 31, is arranged to the exterior side from the air-flow activating unit 30. The valve 34 opens when the air-flow activating unit 30 works in accordance with input of electric power from the solar cells.

Similarly, an air-flow activating unit 40 comprising an electrically operated fan to take air from outside into the cabin is arranged on the fresh-air conducting path 41, and a valve 44 to open or close the fresh-air conducting path 41 is arranged to the exterior side of said air-flow activating unit 40.

For this reason, air which is warmed during parking time and gathers near the ceiling is forcibly discharged to the outside by the air-flow activating unit 30 via the exhaust path 31 with its opening on the ceiling, while cool air with relatively low temperature in the shadow under the vehicle's body 20 is introduced into the cabin by the air-flow activating unit 40 via the fresh-air conducting path 41 with its opening on the external face of the floor panel 25.

Configuration and operation of the air-flow activating unit 40 and the valve 44 are basically the same as those of the air-flow activating unit 30 and the valve 34 on the exhaust path 31, which are described in detail later, and can easily be understood by referring to the description thereof.

Figure 3:
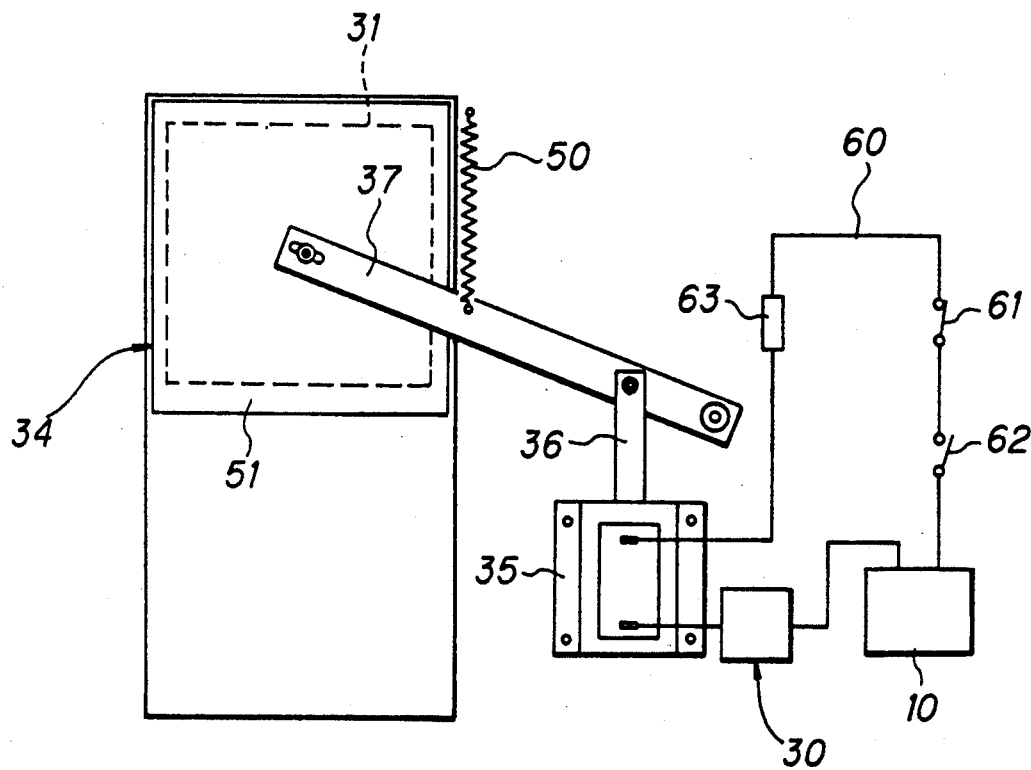
FIG. 3 is a circuit diagram with a rear view of a valve in the exhaust path in a close position.
Figure 5:
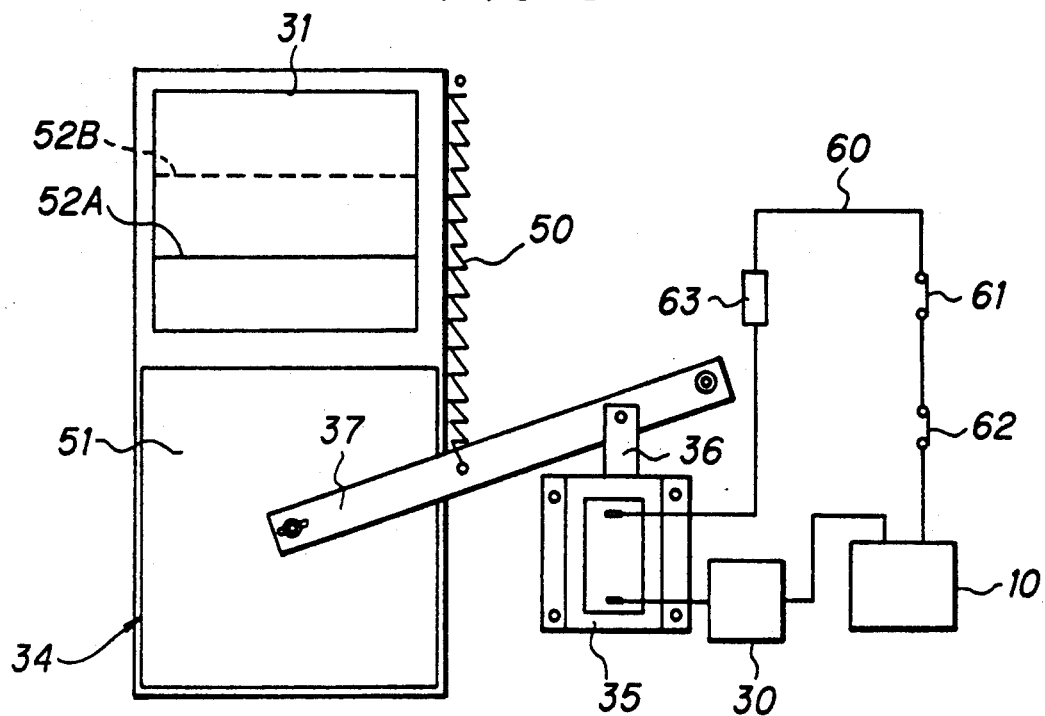
FIG. 5 is a circuit diagram with a rear view of the same valve in an open position.

As shown in FIG. 3 and FIG. 5, the valve 31 arranged in the exhaust path 31 is driven by a solenoid actuator 35. Namely, a valve body 31 is coupled to a link 37 driven by a plunger 36 of the solenoid actuator 35, and when the solenoid actuator 35 is activated, the link 37 makes the valve body 51 slide against a return spring 50, and opens the exhaust path 31 (Refer to FIG. 5).

When the solenoid actuator 35 is not activated, the valve body 51 is kept closed due to effect of the return spring 50 (Refer to FIG. 3).

An electric circuit 60, which drives the air-flow activating unit 30 and the valve 34 with the solar cell 10 has a series combination of a first switch 61 as a power switch, a second switch 62 which works in correlation to an engine key switch of the vehicle not shown in the drawings, and a thermostat 63 which works according to change of temperature in the cabin.

Said second switch 62 correlates to the engine key switch so that it turns ON when the engine switch is turned OFF and it turns OFF when the engine switch is turned ON.

A temperature valve, at which the thermostat 63 starts working by closing its contact, can be set freely. For instance, the contact will be closed when the temperature in the cabin rises above 30 degrees centigrade.

With this feature, when the vehicle stops and the engine key switch is turned OFF, the second switch 62 correlating to said engine key turns ON, and if the first switch 61 as a power switch is kept ON, the valve 34 and 44 will automatically open and simultaneously the air-flow activating units 30 and 40 start working when the thermostat 63 starts working by closing its contact in accordance with temperature increase in the cabin.

With this operation, high temperature air in the cabin is exhausted from the exhaust path 31 to the outside, and also fresh air with low temperature under the vehicle's body comes into the cabin through the fresh-air conducting path 41, thus the cabin automatically and temperature in the cabin in prevented from abnormally rising.

In contrast, when temperature in the cabin does not rise above a value set in the thermostat 63, the air-flow activating units 30 and 40 do not work. Since they work only when the temperature in the cabin rises and ventilation is required, the capacity of the solar cell 10 can be minimized, which also means the possibility of minimizing its size. Note that, on rainy or cloudy days or at night when electric energy generation rate of the solar cell 10 is low, the air-flow activating units 30 and 40 do not work, which is preferable in view of the durability of the air-flow activating units 30 and 40.

When the power switch 61 is OFF or engine is running, the valves 34 and 44 close the exhaust path 31 and the fresh-air conducting path 41 respectively, so that, when driving, especially in the winter, fresh air with low temperature is prevented from coming into the cabin and also loss of warming efficiency does not occur.

Figure 4:
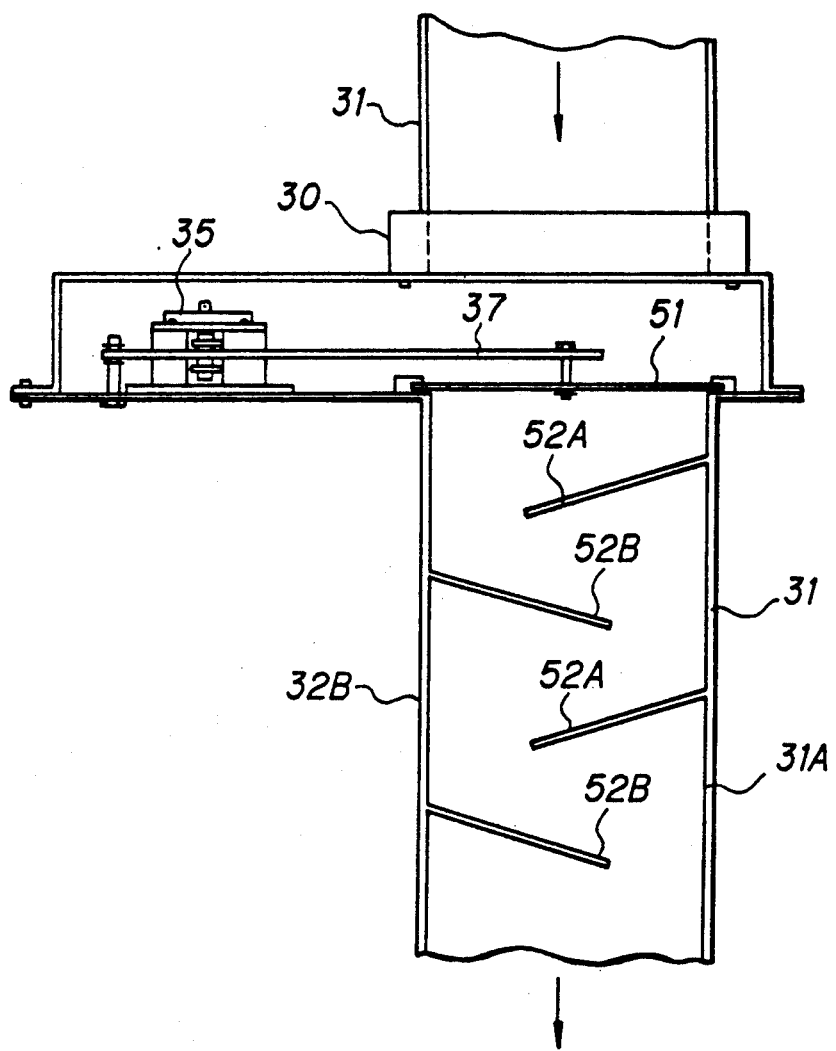
FIG. 4 is a sectional view of the exhaust path at the valve.

As shown in FIG. 4, bulkheads 52A and 52B are arranged at a specified interval alternately on the exterior side from the valve 35 in the exhaust path 31 to prevent water such as rainwater from coming entering the vehicle.

The bulkheads 52A are fixed on a wall 31A of the exhaust path 31 at a certain interval, and the bulkheads 52B are fixed at a certain interval on the wall 31B of the exhaust path 31 which is facing the wall 31A.

Combination of these bulkheads 52A and 52B forms a path bending zigzag to prevent water such as rainwater from coming into the cabin when driving on a rainy day or when cleaning the car.

These bulkheads 52A and 52B are also arranged on the exterior side from the valve 44 in the fresh-air conducting path 41.

Figure 6:
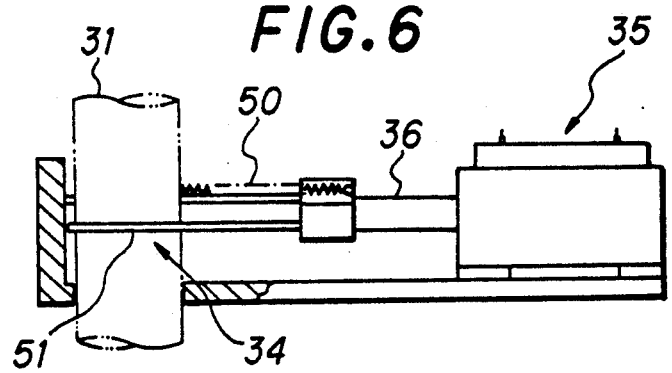
FIG. 6 is a side view of a valve in an exhaust path of another embodiment of the present invention.
Figure 7:
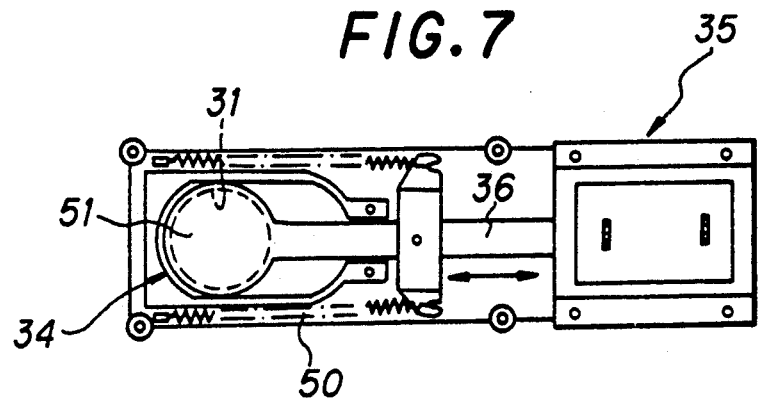
FIG. 7 is a plan of the same valve.

FIG. 6 and FIG. 7 snow another embodiment of the valve 34(44). In this embodiment, the valve body 51 is directly connected to the plunger 36 of the solenoid actuator 35. Note that the plunger 36 is biased by the return spring 50 to the close position of the valve 34.

This invention can be implemented in various forms without deviating from the spirit and scope of the appended claims. The embodiment described in this specification shows an application for a passenger car, but it can also be applied in other types of vehicle such as trucks. The preferable embodiment shown in this specification is illustrative and not restrictive.

We claim:

1. In a car ventilating system for ventilating the air in the cabin of a vehicle and for lowering the temperature in the cabin, the cabin having a ceiling and a floor, wherein an exhaust path penetrates a portion of the vehicle to exhaust air in the cabin, a fresh air conducting path penetrates a portion of said vehicle to conduct fresh air into the cabin, an intake valve is arranged in said fresh air conducting path, air flow activating means are arranged in said fresh air conducting path in series with said intake valve, a solar cell is installed on an external surface of said vehicle to receive sunlight for generating electricity, and an electric circuit is connected to drive said air flow activating means and said intake valve with the electricity generated by said solar cell, the improvement wherein:

said exhaust path has an exhaust inlet port on the ceiling of the cabin, an exhaust outlet port extending through a floor of the vehicle body, an exhaust valve in said exhaust outlet port, an electrically operated exhaust fan in said exhaust outlet port inwardly of said exhaust valve with respect to said cabin and a pipe arrangement extending through the vehicle body to interconnect said exhaust inlet port and exhaust outlet port, said exhaust port being mounted in said floor to exhaust air downwardly through said floor and opening to the outside below said vehicle, said fresh air conducting path has an fresh air inlet port extending through the floor of the vehicle body, said air flow activating means comprising an electrically operated fan in said fresh air inlet port, said inlet port opening to the outside of said vehicle below said floor and being mounted to intake air upwardly from below said floor and vehicle, said intake valve is positioned in said fresh air inlet port outwardly of said cabin from said electrically operated fan and comprises a valve body coupled to be driven to an open position by a solenoid and returned to a closed position by a spring, said system further comprising a plurality of bulkheads mounted in said exhaust port outwardly of said exhaust valve from said cabin, to prevent rain water from coming into the cabin through said exhaust port, a plurality of bulkheads mounted in said fresh air conducting path outwardly of said valve from said cabin, to prevent rain water from coming into the cabin through said fresh air inlet port, said electrical circuit comprising a series connection of a power switch, a thermostat responsive to temperature in the cabin, and a switch connected to automatically open said circuit when an engine key of the vehicle is turned on.

2. A car ventilating system for ventilating the air in the cabin of a vehicle having an engine, and for lowering the temperature in the cabin, the cabin having a floor and a ceiling, comprising an air intake port in said floor open externally of said vehicle below said vehicle and floor and directed to intake air upwardly from below said floor and vehicle, an air exhaust port in said floor of said cabin, said exhaust port opening externally of said vehicle below said floor and being directed to exhaust air below said floor and vehicle, electrically operated valves in each of said intake and exhaust ports, bulkheads in each of said intake and exhaust ports, outwardly of the respective valves and positioned to inhibit the flow of rainwater into said cabin, an electrically operated first air moving means in said air intake port inwardly of the respective valve with respect to said cabin, for flowing air directly into said cabin from below said floor and vehicle, an air exhaust piping means connected to direct air from the ceiling of said cabin into said air exhaust port, an electrically operated second air moving means in said air exhaust port inwardly of the respective valve with respect to said cabin, a solar cell mounted to the exterior of the vehicle, and an electric circuit connected to energize said first and second air moving means with electrical power from said solar cell and to control said valves, said circuit including a serially connected switch that is responsive to the temperature in said cabin, and a serially connected switch adapted to be closed in response to operation of said engine.

3. The car ventilating system of claim 2 wherein said first and second air moving means comprise separate fans connected to be deenergized during operation of said engine.

4. The car ventilating system of claim 2 wherein said electrically operated valves comprise solenoids connected to open said valves when said engine is not operated, and spring means for closing said valves.

* * * * *